Aug. 7, 1951     R. P. ATKINSON ET AL     2,563,302
ROTOR SHIFTER
Filed July 8, 1950
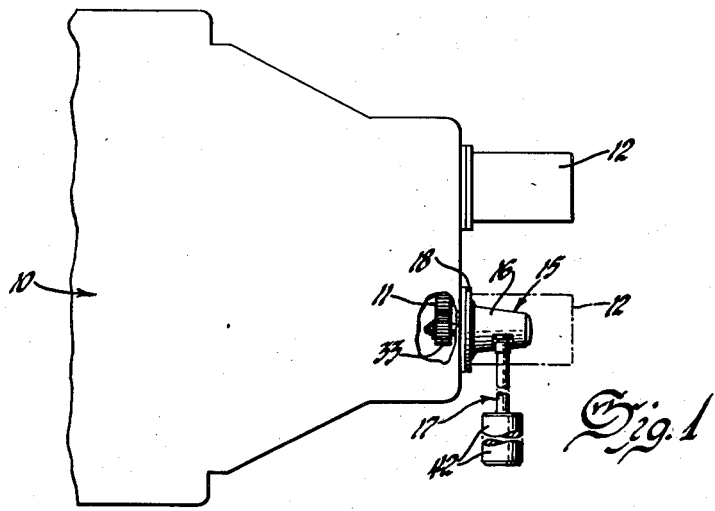
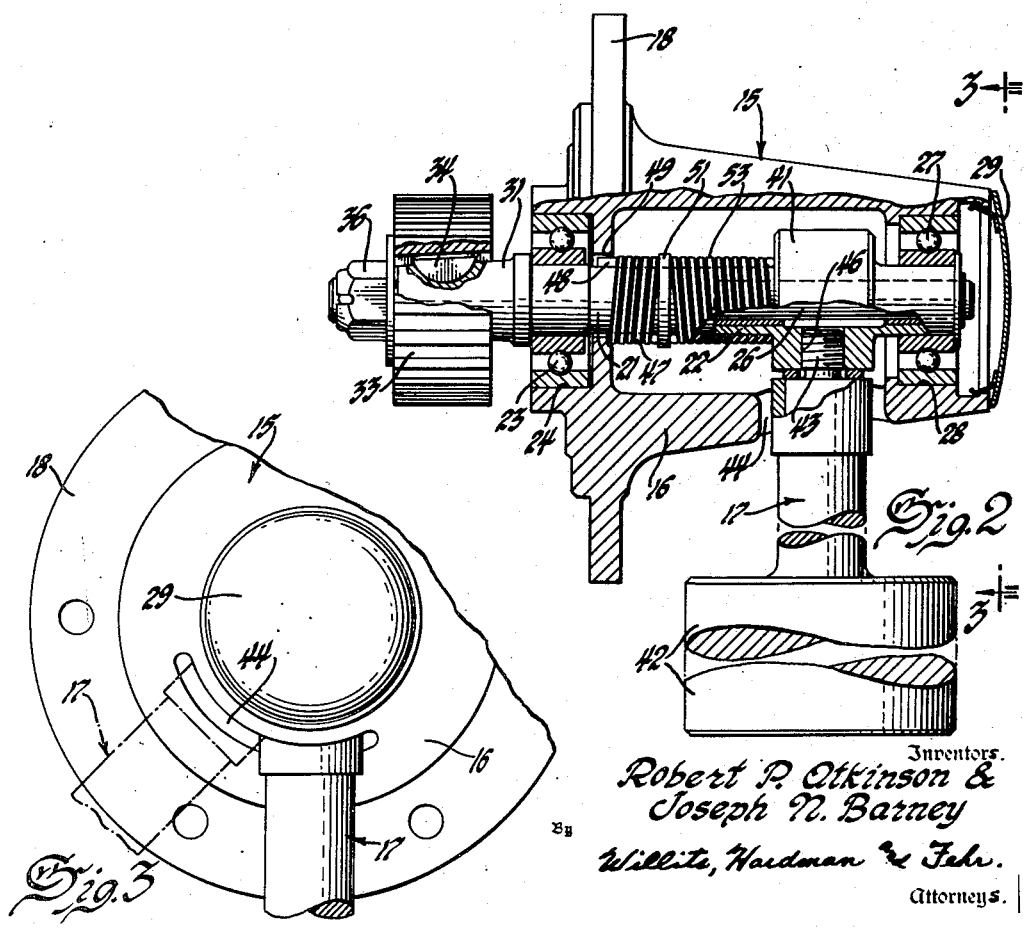
Inventors.
Robert P. Atkinson &
Joseph N. Barney
Willits, Hardman & Fehr.
Attorneys.

Patented Aug. 7, 1951

2,563,302

UNITED STATES PATENT OFFICE 2,563,302

ROTOR SHIFTER

Robert P. Atkinson and Joseph N. Barney, Indianapolis, Ind., assignors to General Motors Corporation, Dayton, Ohio, a corporation of Delaware Application July 8, 1950, Serial No. 172,708

2 Claims. (Cl. 74—88)

Our invention relates to a rotor shifter or, in other words, to the combination with a rotor of a mechanism for slowly rotating or shifting the rotor so that its weight will not be continuously carried by any one member of the bearing for the rotor during transportation of the rotor or of the apparatus embodying the rotor.

The primary object of our invention is to provide a combination of elements that will operate to prevent damage to the rotor and its bearing during transportation. Broadly we attain this primary object by providing, in combination with the rotor, a mechanism operating in response to the usual transportation jolts and jars to rotate the rotor slowly in one direction.

More specifically, we accomplish our objective by providing, in combination with the rotor, a clutch operative to engage and disengage the rotor shaft with a pendulum operating in response to the jolts and jars and uneven movement of the carrier in transportation.

Further objects and advantages of the present invention will be apparent from the following description, reference being had to the accompanying drawings, wherein a preferred form of the present invention is clearly shown.

In the drawing:

Fig. 1 is a fragmentary view showing one end of a jet engine having a clutch device secured thereto and a clutch operating means;

Fig. 2 is an enlarged view of the clutch and its operating means disclosed in Fig. 1 shown partly in section and partly in elevation; and, Fig. 3 is an end view of the clutch taken in the direction of the arrows 3—3 of Fig. 2 illustrating therein movement of the clutch operating means.

Referring to the drawings, for illustrating our invention, we have shown in Fig. 1 thereof one end of a conventional jet engine 10. Such engines ordinarily have a rotor or rotatable element 40 therein supported in bearings of the type comprising a series of balls or rollers spaced apart about the circumference of the bearing. The rotor or rotatable element of engine 10 carries a large gear 11 usually connected by smaller pinion gears to one or more electric motors 12 employed, when energized, to rotate the rotor or rotatable element of the engine to start operation thereof. The electric motors 12 are bolted or otherwise suitably secured to the end housing of engine 10 and are readily removable from the engine. When the engine is assembled and readied for shipment, one or more, as desired, of the electric motors 12 is removed therefrom and replaced by a device generally represented by the reference character 15. (See Fig. 1.) In the present disclosure, device 15 includes a housing 16 containing a clutch mechanism for a purpose to be hereinafter described and a clutch operating means 17 connected to a part of the clutch and extending outwardly of the housing 16. The housing 16 of device 15 is provided with a shouldered flange 18, corresponding to the shouldered flange on the electric motors 12, and adapted to register with and be secured to a similar shouldered and flanged opening provided in the end of jet engine 10. The clutch device 15 comprises two shafts 21 and 22 (see Fig. 2), one fitting over the other and being rotatable relative to one another. Shaft 21 is mounted in a ball or the like bearing 23 located in the counterbored cavity 24 provided therefor in clutch housing 16. Shaft 21 includes a small diametered shank portion 26 which fits into an opening provided in shaft 22 with suitable bronze or the like bearings therebetween. Shaft 22 has its one end mounted in a ball or the like bearing 27 located in a counterbored portion 28 in the clutch housing 16 and supports the portion 26 of shaft 21. A snap-on plate or the like 29 is secured to housing 16 to close the bearing 27 and the ends of shafts 21 and 22 therein. The other end 31 of shaft 21, which projects outwardly from housing 16, has a pinion gear 33 keyed thereto for rotation therewith by a key 34 and a nut 36 holds the pinion gear in place as is conventional in such structures. When the clutch device 15 is bolted to the jet engine 10 in place of one of the electric motors 12, pinion gear 33 meshes with and is adapted to rotate the large gear 11 on the engine's rotor or rotatable element.

Shaft 22 of the clutch device 15 is provided with an enlarged portion 41 to which the clutch operating means 17 is secured. In the present disclosure the clutch operating means 17 comprises a pendulum having an enlarged weighted end 42 and a small diametered shank portion threaded on its end as at 43. The shank portion of pendulum 17 extends through an elongated arcuate-shaped slot 44 provided in the wall of housing 16 and the end 43 thereof is threaded into a suitably tapped opening 46 in the enlarged portion 41 of shaft 22 (see Fig. 2). The portion of shaft 21 adjacent the shank portion 26 thereof abuts against the innermost end of shaft 22, and the portions of each shaft 21 and 22 adjacent this abutment thereof are of the same outside diameter. A spring 47, coiled in one direction, has a projection 48 at its outer end anchored in a slot 49 milled or cut in the housing 16. The other or inner end of spring 47 abuts against a washer 51 surrounding the shaft 21. Intermediate washer 51 and the enlarged portion 41 of shaft 22 there is placed a spring 53, coiled in the opposite direction to the direction of coiling of spring 47. In other words, spring 47 is wound in a left-hand helix form and spring 53 is wound in a right-hand helix form. The washer 51 between springs 47 and 53 prevents the ends of these springs from becoming interlocked together. The inner diameter of springs 47 and 53 is identical, and this diameter is slightly smaller than the diameter of the portions of shafts 21 and 22 which they surround or embrace. Springs 47 and 53 are forced onto the shafts 21 and 22 so as to tightly grip the portions thereof surrounded by the springs. A spring-actuated clutch comprising the parts described is conventional in the art and well known to the trade as an L. G. S. type of spring clutch manufactured and sold by L. G. S. Spring Clutches, Inc. of Indianapolis, Indiana. The principle of operation of such clutches is disclosed in many patents owned by or issued to this company.

The engine 10, having one of the motors 12 removed therefrom, and a clutch device 15 as herein disclosed attached to the engine as previously described and shown in Fig. 1 of the drawing, is loaded onto a freight car or other suitable carrier for transportation to its prescribed designation. The car or carrier while in motion vibrates during its travel, and we utilize such normal vibrations and also changes in speed of the carrier, due to changes in acceleration, for operating an inertia means which actuates or rotates the clutch device disclosed. As the carrier upon which engine 10 is mounted travels, its vibrations and/or changes in speed swing the inertia means or pendulum 17 upwardly or clockwise as shown in dot-dash lines in Fig. 3 of the drawing. When the pendulum starts to swing upward, the gripping spring 53 unwinds and releases its grip on the shafts 21 and 22 of clutch 15 to permit the shaft 22 to rotate while the shaft 21 remains stationary. Thereafter the weight of the weighted end 42 of pendulum 17 causes the pendulum to move down or counterclockwise by gravity as viewed by the full line showing thereof in Fig. 3 of the drawing. As the pendulum 17 starts to move downwardly, spring 53 tends to wind and grip the shafts 21 and 22 and further downward movement thereof together with the springs 47 and 53 tightly gripping shafts 21 and 22 causes the shafts to rotate whereby pinion gear 33, secured to shaft 21, is rotated to rotate gear 11 and consequently the rotor or rotating element of engine 10. It is to be understood that spring 53, upon gripping shafts 21 and 22, rotates simultaneously with the shafts when pinion gear 33 is rotated. It is to be further understood that spring 47, being locked at one end and snugly fitting shaft 21, prevents this shaft from rotating when spring 53 unwinds such as during the upward swing of pendulum 17. In this manner, we employ an inertia means to rotate the rotor or rotating element of the engine 10.

It should be apparent from the foregoing that a heavy rotor of an engine or a rotating element of other similar apparatuses is shifted or rotated and is thereby prevented from resting for prolonged periods of time on one of the ball members of the bearing in which it is mounted throughout continued jolts of the carrier and transmitted to the engine. Rotation of the engine rotor causes the weight thereof, at least part of the time during transportation of the engine, to be distributed over two or more ball members of the bearing or at least prevents the rotor from continually resting on one ball member of the bearing to cause damage thereto. Our improvement thereby insures that engines or other apparatuses having a heavy rotor or rotatable shaft element can be shipped to far distant points without fear of parts thereof being damaged by shocks resulting from jolts of the carrier upon which they are transported.

While the form of the embodiment of the invention as herein disclosed, constitutes a preferred form, it is to be understood that other forms might be adopted, as may come within the scope of the claims which follow.

What is claimed is as follows:

1. In combination, an apparatus having a rotatable element mounted in a bearing therein, said bearing including a series of bearing members spaced apart about the circumference thereof, means for preventing damage to said bearing during transportation of the apparatus on a carrier due to the weight of the rotatable element on one of said bearing members, said means including a spring actuated clutch connected to said element and adapted to unidirectionally rotate the same, and inertia means attached to said spring clutch and movable in response to normal vibrations of the carrier in motion for operating the clutch to cause rotation of said rotatable element.

2. In combination, an apparatus having a rotatable element mounted in a bearing therein, said bearing including a series of bearing members spaced apart about the circumference thereof, means for preventing damage to said bearing due to jolting of the weight of the rotatable element throughout prolonged periods of resting on certain of said bearing members while transporting the apparatus on a carrier, said means including a spring actuated clutch having one end thereof connected to said element and having an inertia means attached to its other end for operating the spring clutch to cause unidirectional rotation of said rotatable element, and said inertia means being rendered effective in response to normal vibrations of the carrier in motion.

ROBERT P. ATKINSON.
JOSEPH N. BARNEY.

REFERENCES CITED

The following references are of record in the file of this patent:

FOREIGN PATENTS

| Number | Country | Date |
| --- | --- | --- |
| 29,609 | Great Britain | of 1910 |
| 142,790 | Switzerland | Oct. 15, 1930 |